May 2, 1944.  W. J. PEETS ET AL  2,348,025
CLUTCH AND BRAKE MECHANISM
Filed April 19, 1941  2 Sheets-Sheet 2

Witness:
John N. Cave

Inventor
Wilbur J. Peets
and
John Roll

By John F. Heine
Attorney

Patented May 2, 1944

2,348,025

UNITED STATES PATENT OFFICE 2,348,025

CLUTCH AND BRAKE MECHANISM

Wilbur J. Peets, Elizabeth, and John Roll, Union, N. J., assignors to The Singer Manufacturing Company, Elizabeth, N. J., a corporation of New Jersey Application April 19, 1941, Serial No. 389,286

1 Claim   (Cl. 192—113)

This invention relates to driving devices and more particularly to a unitary motor, clutch and brake arrangement which is particularly adapted for driving manufacturing types of sewing machines where frequent operation of the clutch and brake to start and stop the machines is necessary.

One of the objects of this invention is to provide improved means for cooling the clutch elements during the operation of the device.

Another object of the invention is to provide improved means for preventing the driven element of the clutch from engaging the driving element after the friction material interposed between the two elements becomes worn.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
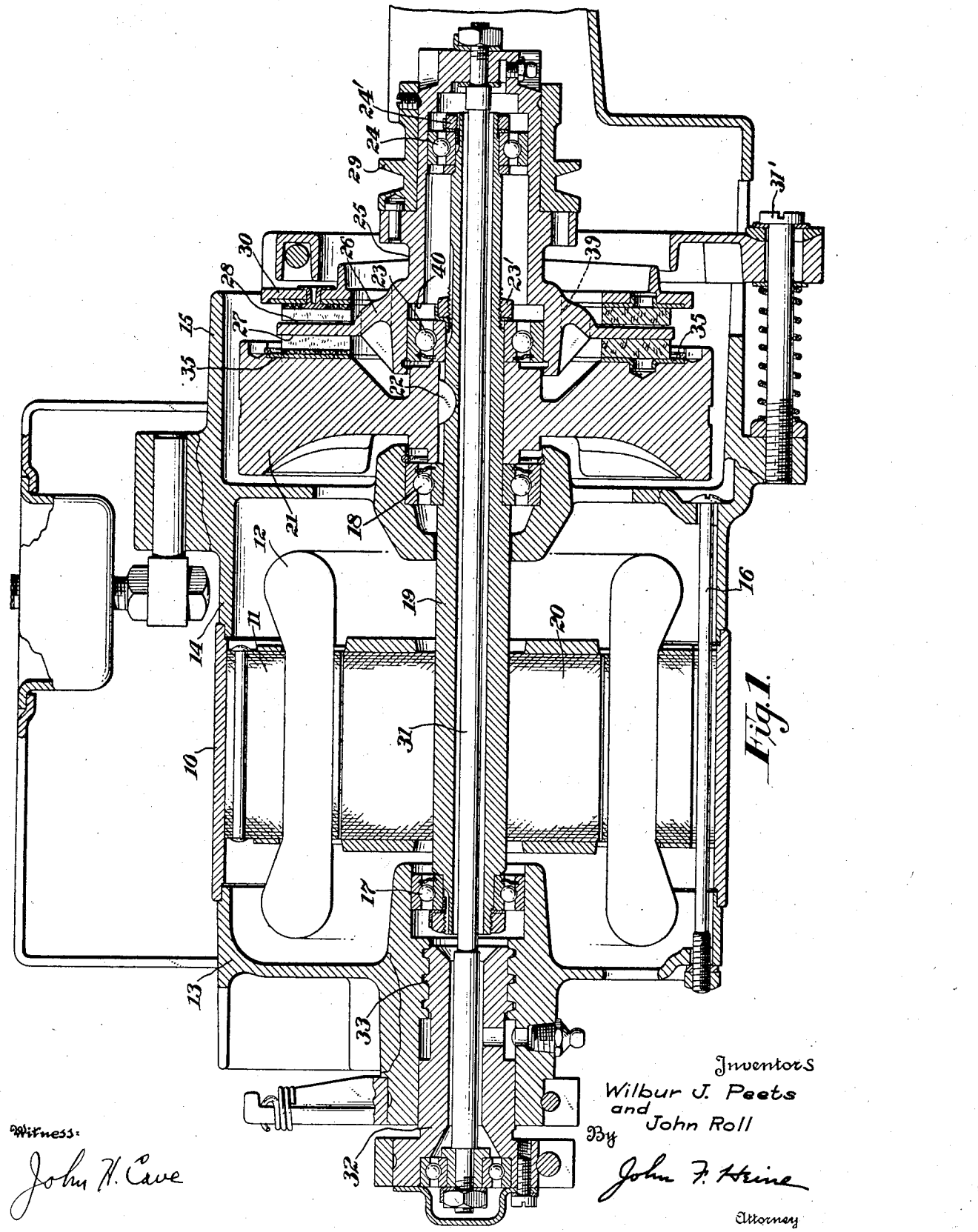
Fig. 1 is a longitudinal sectional view taken through an electric transmitter having our improvements embodied therein.

In the embodiment of this invention selected for illustration, the frame of the transmitter is of hollow cylindrical form and comprises a motor field section 10 having the usual field core 11 carrying-exciting windings 12. The field frame section 10 is closed at one end by an end bonnet 13, and the other end is closed by an end bonnet 14 formed with a laterally extending flange 15 which forms a covering for the flywheel and clutch mechanism. The end bonnets 13 and 14 are clamped to the field frame by means of bolts, one of which is indicated as 16 in the drawings.

Carried by the end bonnets 13 and 14 are ball bearings 17 and 18 in which is journaled the hollow motor shaft 19. One end of the shaft extends into the clutch housing, and fixed to it at a point intermediate the bearings 17 and 18 is a rotor 20 which may be of the ordinary squirrel cage type. Located within the clutch housing 15 is the driving element or flywheel 21 which is secured to rotate with the shaft 19 by a key 22. Also carried by the shaft 19 are the ball bearings 23 and 24, the inner race of these bearings being fixed to the shaft by the nuts 23' and 24', respectively, to prevent both lateral and rotary motion relative to the shaft. Slidably mounted on the periphery of the outer race of the ball bearings 23 and 24 is the cup-shaped hub 25 of the driven clutch disk or element 26. The driven element 26 has a flange-like portion which is formed with smooth opposed faces 27 and 28 and has removably secured to it, by any suitable means, a pulley 29. Also carried by the transmitter frame is a brake holding member 30 which is adjustable to and from the driven element by the screw 31'. It will be understood that the driven element 26 is moved or shifted, by the sewing machine operator between the driving element and the brake by means of a rod 31 which is actuated by a sleeve 32 having a steep pitched thread 33. The sleeve 32 may be turned by a lever or any other suitable means. For a more detailed and complete description of the mechanism above described reference may be had to our Patent No. 2,274,457, dated February 24, 1942.

Figure 2:
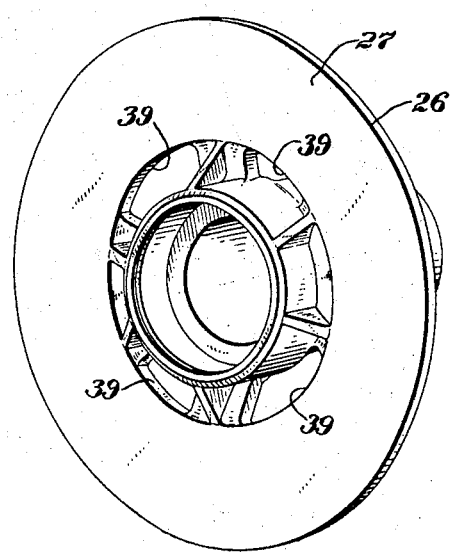
Fig. 2 is a perspective view of the driven clutch element looking from the side which engages the driving element.
Figure 3:
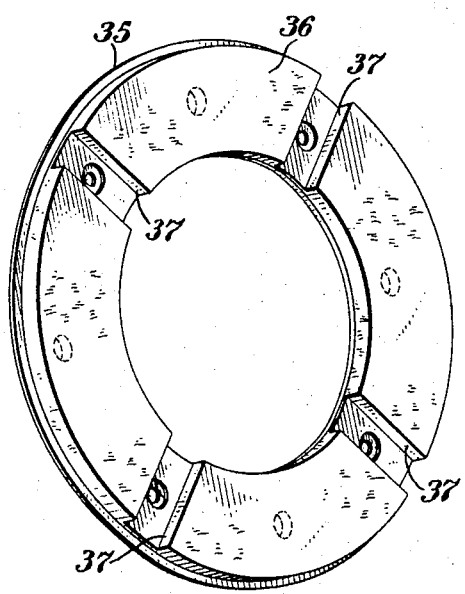
Fig. 3 is a perspective view of one of the removable and replaceable friction rings which are interposed between the driving and driven elements and also between the driven element and the brake.

Interposed between the driving element 21 and the driven element 26 is a friction ring comprising a ring of resilient sheet-metal 35 which has cemented to one of its faces a clutch facing or ring of friction material 36 having a smaller outer diameter than the outer diameter of the metal ring 35 and is preferably made of cork or the like. When the clutch is "slipped" so that the machine will operate slowly, or when the machine is stopped and started every few seconds, the flange of the driven element 26 and the friction ring 36 generate heat and become hot thereby causing rapid disintegration of the friction ring. To avoid this overheating, we have provided the driven element 26 with openings 39 (Fig. 2) which are arranged adjacent the hub and the facing 36 of the friction ring has been formed with radially arranged slots 37. The rotation of the friction ring causes the slots to act as a centrifugal fan and draw air through the openings 39 and between the driving and driven elements to cool these elements, the air being discharged at the outer periphery of the friction ring. It will be understood that the friction ring for the brake is identical with that used for the driven element.

To avoid metal to metal contact between the driving element and the driven element after the clutch facing has become worn, we have formed the interior bore of the hub 25 with a shoulder 40 which is arranged so that it will engage the outer race of the ball bearing 23 before the driven element will engage the metal ring 35, or in other words the distance between the outer race of the ball bearing 23 and the shoulder 40 is slightly less than the distance between the face 27 of the driven element 26 and the metal ring 35 which is fixed to the flywheel 21. With this construction it will be obvious that the possibility of scoring the contacting face 27 of the driven element 26 is eliminated.

Having thus set forth the nature of the invention what we claim herein is:

A friction element for a power transmitter comprising a ring of sheet metal, a smaller ring of non-metallic friction material adhesively secured to one face of said sheet metal ring with the periphery of said metal ring projecting beyond the periphery of said friction ring, said friction ring having in its exposed face a plurality of radially disposed slots extending only partially therethrough.

WILBUR J. PEETS.
JOHN ROLL.